Jan. 12, 1960
J. R. BENSON
2,921,105
PROCESS FOR RUBBERIZING BITUMEN BY INTERBLENDING
RUBBER LATEX WITH MOLTEN BITUMEN
Filed Oct. 8, 1958
2 Sheets-Sheet 1
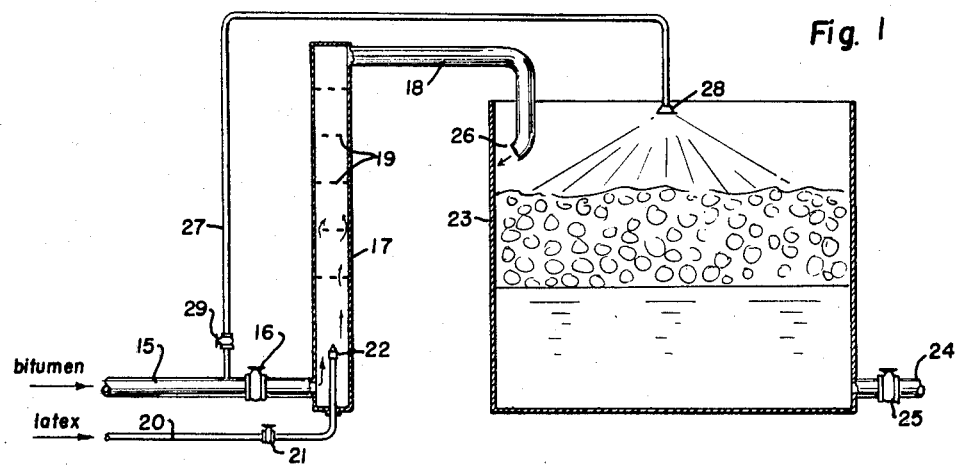
Fig. 1
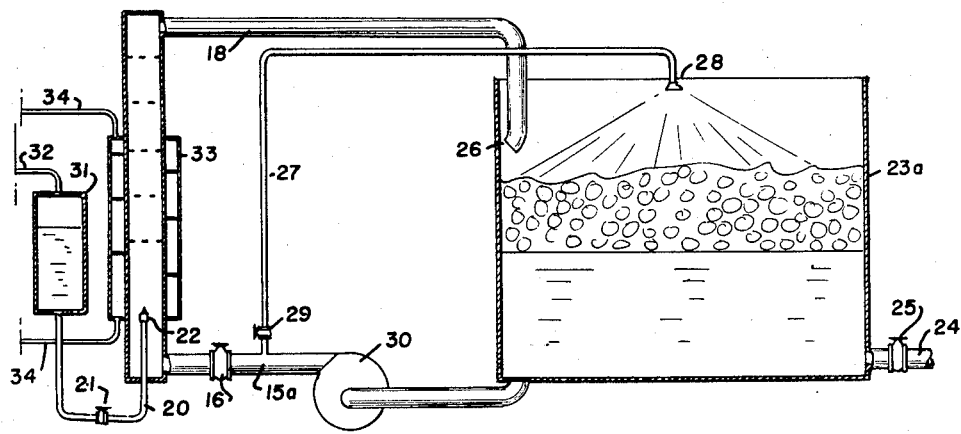
Fig. 2
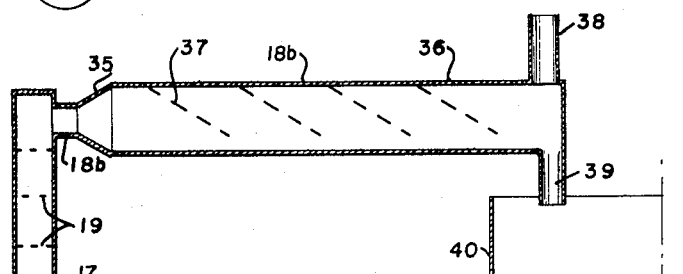
Fig. 3
INVENTOR.
Jewell R. Benson
BY WHITEHEAD, VOGL & LOWE
PER 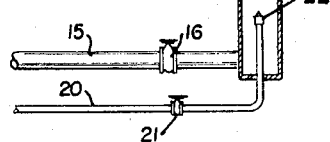
ATTORNEYS

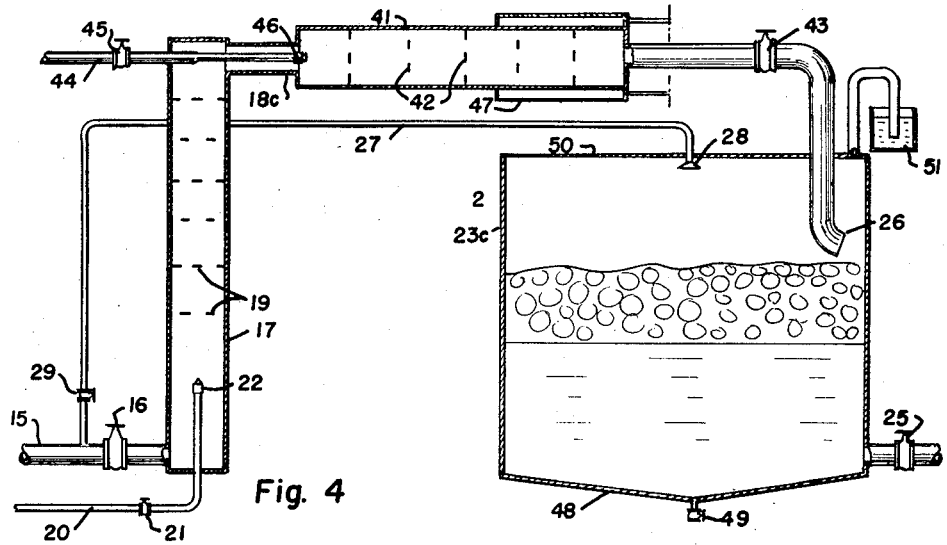
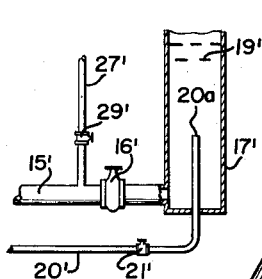
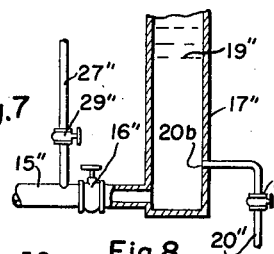
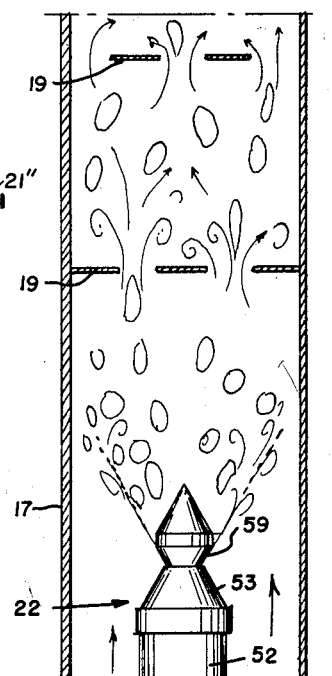
Jan. 12, 1960 J. R. BENSON 2,921,105
PROCESS FOR RUBBERIZING BITUMEN BY INTERBLENDING
RUBBER LATEX WITH MOLTEN BITUMEN
Filed Oct. 8, 1958 2 Sheets-Sheet 2
INVENTOR.
Jewell R. Benson
BY WHITEHEAD, VOGL & LOWE
PER Frank C. Lowe
ATTORNEYS

United States Patent Office 2,921,105
Patented Jan. 12, 1960

2,921,105
PROCESS FOR RUBBERIZING BITUMEN BY INTERBLENDING RUBBER LATEX WITH MOLTEN BITUMEN

Jewell R. Benson, Denver, Colo.

Application October 8, 1958, Serial No. 766,046

13 Claims. (Cl. 260—758)

This invention relates to processes for the manufacture of rubberized bitumen such as, for example, asphalt, tar and the like, and more particularly to such processes as are designed to manufacture of rubberized bitumen by the interblending of an aqueous latex into a bitumen.

A recent development in that field of technology which deals with tars and asphalts, hereinafter referred to as bitumens, involves combining with the bitumen a relatively small amount of natural or synthetic rubber, hereinafter referred to in this specification and in the claims as rubber. The resulting product, hereinafter referred to as rubberized bitumen and/or as rubberized asphalt, has physical properties far superior to those of the bitumen alone and there is now a steady and increasing demand for rubberized asphalt for road building and the like. Accordingly, there is a need for improved methods and apparatus for manufacturing large amounts of rubberized asphalt quickly, efficiently and cheaply, and a primary object of this invention is to provide such process and apparatus for meeting this need.

The mechanics involved in the combining of a rubber with a bitumen are not fully understood, but it appears that a hot fluid bitumen will absorb a certain amount of the rubber almost as if the elastomer were going into solution or being dispersed as a colloid into the bitumen, and that greater amounts of the rubber mix into the bitumen as discrete particles. Although the limit of absorption, a so-called saturation point, will occur with about two to three percent rubber, depending upon the type of rubber and bitumen used, rubberized asphalts containing up to fifteen percent rubber will have useful properties. Nevertheless, for many purposes the best product is a rubberized asphalt having only sufficient rubber therein to reach the so-called saturation point since the discrete particles cause physical changes with aging of the product, such as shrinking. One serious difficulty in the mixing of rubber and bitumen by conventional methods lies in the fact that even with selected proportions of rubber the mixing or absorption will not be efficient because factors, such as inter-coagulation of the rubber particles, vulcanization and the like, cause the formation of such discrete particles which are difficult, and in some cases, impossible of efficient dispersion in the bitumen.

One conventional method is to mix powder, crumbs, or the like of rubbers into the bitumen, a so-called dry method. The disadvantages of this method include the fact that there is an increased expense in obtaining the rubber in the dry form, particularly with the types of synthetic elastomers which are in a latex form in their final stage of polymerization; the fact that the particles are coagulated and partially oxidized or vulcanized and thus cannot be efficiently absorbed in the bitumen; and the fact that the rubber might be overheated and become depolymerized or otherwise decomposed if the bitumen is heated to a point above the depolymerization temperature.

A second conventional method is to mix a latex carrying an emulsified rubber into the bitumen by adding the latex to the bitumen in a manner which slowly evaporates the water and works the rubber from the latex into the bitumen by mechanical agitators. The disadvantages of this method are centered around the tendency of the rubber to coagulate in the thickened latex as the water evaporates and become essentially non-dispersible. Also, with these conventional mixing methods, particularly the mixing of a latex, where a large batch of rubberized asphalt is to be produced, it is desirable to make a concentrate by mixing the entire amount of rubber with a small part of bitumen, otherwise the mixing equipment would be inordinately large and expensive. However, with the concentrate, discrete particles of rubber are formed which do not easily return to solution when the concentrate is mixed with the bulk of the bitumen; furthermore, the concentrate becomes very viscous and must be heated to high temperatures to be worked even at the risk of the rubber becoming depolymerized.

With these, and other factors in view, the present invention was conceived and developed, and comprises, in essence, a process for introducing latex containing rubber into a moving mass of hot liquid bitumen to accomplish the following further objects of the invention, which are to provide: (a) a quick, substantially instantaneous, transfer of the rubber from the latex to the bitumen; (b) a transfer of rubber from the latex to the bitumen in a highly dispersed state regardless of the relative proportions used; (c) a transfer of the rubber from the latex to the bitumen and uniform mixing therein in a continuous flowing operation, and with the necessity of only a single pass of the bitumen through the mixing apparatus; (d) an operation which permits great quantities of rubberized asphalt to be produced with relatively simple and inexpensive apparatus; (e) an operation which permits the manufacture of cut-back rubberized asphalt with a single pass of the bitumen through the mixing apparatus; (f) an operation also suited for recirculation of batches of rubberized asphalt in special cases; (g) an operation which may be accomplished with bitumen at high temperature without the danger of depolymerizing the rubber; (h) an operation which uses the ingredients in their simplest, most economical and most easily handled forms, and be performed quickly and economically; (i) an operation which results in a high-quality product; (j) an operation which may be performed with simple, inexpensive and easily operated apparatus; and (k) an operation which will produce a rubberized bitumen of high quality.

With the foregoing and other objects in view, all of which more fully hereinafter appear, my invention comprises certain novel and improved operations, steps and methods as hereinafter described, and as defined in the appended claims, and illustrated, in preferred embodiments, in the accompanying drawing, in which:

Fig. 1 is an elevation view, partially in section and diagrammatic in nature, of apparatus adapted to manufacture rubberized asphalt in accordance with my invention.

Fig. 2 is an elevation view, similar to Fig. 1, but illustrating the addition of a reheating jacket and the adaptation of the apparatus for recirculation batch treatment in special cases.

Fig. 3 is an elevation view, similar to Fig. 1, but illustrating a modified arrangement of the apparatus.

Fig. 4 is an elevation view, similar to Fig. 1, but further modified to provide for the manufacture of a rubberized cut-back asphalt.

Fig. 5 is an enlarged sectional detail of the nozzle element of the apparatus of Figs. 1 to 4.

Fig. 6 is a sectional view of elements illustrated in Figs. 1 to 4 but on an enlarged scale and with flow arrows sketched to suggest the mixing action of the latex in the bitumen.

Fig. 7 is an elevational view partly in section of a portion of an apparatus similar to that shown in Fig. 1, but showing a different manner of introducing the latex into the bitumen.

Fig. 8 is a sectional view similar to Fig. 7 but showing another different manner of introducing the latex into the bitumen.

Generically, my invention provides means and steps of operation whereby a rubber-carrying latex of a desired type may be introduced into a moving body of hot liquid bitumen in such a manner as to provide for evaporation or flashing of the water constituent of the latex whereby the rubber is transferred from the latex into the bitumen in a colloidal-like state of dispersion, the same as it was in the latex. Such action preferably is accomplished by turbulence and mixing of the bitumen mass.

The introduction of the latex into the bitumen may be accomplished by injecting it into a moving body of the hot asphalt through an atomizing type nozzle, or otherwise, followed by continued agitation of the asphalt to provide complete and uniform dispersion throughout the asphalt of the rubber deposited therein by the flashing of the water out of the latex in the form of steam.

A further desirable step involves the use of froth breaking means to free the steam from the asphalt mass.

A further desirable step involves the use of reheat means. The relatively low specific heat of the bitumen and the high latent heat of evaporation of water causes a substantial temperature drop in the bitumen mass at the latex injection region even when only a small percentage of latex is used. This action is a natural safety factor, preventing an overheated bitumen from depolymerizing the rubber, but at the same time may cause such a large temperature drop as to make the rubberized asphalt too viscous to handle.

The process may also include preparation of cut-back bitumens by introducing a volatile solvent into the rubberized bitumen. Such solvent is added to the bitumen after the introduction of the latex since such solvents cannot be ordinarily used at temperatures high enough to flash the water in the latex into steam. However, it is within the invention to provide pressurized means for injecting a latex into a cut-back bitumen and thereby attain temperatures high enough to provide for the desired flashing of the water.

Fig. 1 illustrates a preferred apparatus wherein an unlimited quantity of asphalt may be continuously rubberized. The bitumen is heated to about 400° F., or higher to render the bitumen fluid and to cause flashing of the latex water as hereinafter explained. It may be heated in any conventional manner and in a container or other apparatus, not shown. The hot bitumen will be pumped into the apparatus through a line 15 under moderate pressure, line 15 having a regulating valve 16 to control the flow into the apparatus.

Rubber deposited from latex, as later described, will withstand temperatures around 400° F. for a considerable time without depolymerization and will likewise withstand considerably higher temperatures (perhaps up to 600° F.) for exceedingly short periods, such as a second or so. This fact and the necessity of avoiding depolymerization of the rubber obtained from the latex must be kept in mind in connection with the description and operation of the apparatus.

The apparatus includes a blending chamber 17, preferably formed as a vertical, end-closed, standpipe having the bitumen supply line 15 entering its bottom and a discharge line 18 leading from its top, whereby movement of bitumen from the supply line 15 is upwardly and through the chamber 17. This movement or flow of bitumen through the chamber 17 is disrupted by a plurality of transversely disposed baffles 19 which are arranged in sequence through the chamber 17 beyond the point of latex injection, to thoroughly agitate, stir and mix the bitumen and rubber released thereinto by the flashing of the water out of the injected latex during the movement through the chamber, as will now be described.

The latex is supplied from a pressure line 20 including a regulating valve 21. Line 20 enters the bottom of chamber 17 and extends upwardly therein to a point above the bitumen supply line entrance so as to be well within the upward flowing bitumen in the chamber, with an atomizing type nozzle 22 at its terminus. The adjustment of valves 16 and 21 permits any selected proportions of bitumen and latex to be intermixed within chamber 17, the latex being injected into the upwardly moving hot bitumen through the nozzle 22 as an upwardly and outwordly diverging annular sheet because of the pressure in line 20 and the shape and construction of the head 22 as hereinafter described in detail.

The introduction of the latex into the hot bitumen in the manner just described causes an almost instantaneous flashing of the water component of the latex into steam, the rubber component tending to mix with and disperse through the bitumen. This flashing of the water into steam decidedly cools the bitumen so it is possible to have the bitumen temperature considerably above 400° F. when it enters the chamber and still avoid depolymerization of the rubber left in the bitumen by the flashing of the water. The generation of the steam causes a turbulence and frothing of the bitumen within the chamber and immediately above the atomizing head which results in a dispersion or atomization of the rubber of the latex into the hot bitumen. The baffles are positioned above this point and, as the mass passes them, they aid in completing the even dispersion of the rubber throughout the asphalt and also in the release of entrapped steam. It follows that the rubber is completely intermixed with and dispersed throughout the asphalt in the previously selected proportions, and, even where such a large percentage of rubber is used that the above referred to saturation point is exceeded, the remaining discrete particles of rubber will be exceedingly small and completely diffused throughout the mass.

The frothed bitumen is discharged from the chamber 17 through line 18 and into a froth-breaking tank 23. Thence, the mixed bitumen, now rubberized asphalt, is drawn from the tank 23 through a draw-line 24 at the bottom of the tank and to other storage tanks or the like, not shown, for storage and ultimate use as a finished product. A conventional control valve 25 is placed in line 24 to regulate the draw to make the same continuous or intermittent.

The control or breaking of froth is accomplished in several ways, and it is contemplated that any ordinary method of dispersing the froth may be used. The discharge line 18 is preferably adapted to be turned against the wall of the tank 23, as at 26, to provide a smooth non-splashing flow insofar as possible, and to permit the froth to quietly rise above the body of the bitumen within the tank 23. A secondary line 27 extends from the line 15, from the pressure side thereof, and to a nozzle 28, which is adapted to spray hot bitumen on the froth to break up the bubbles, the flow through this line 27 being controlled by a valve 29. Although the bitumen flowing through the line 27 is not mixed with rubber, it is of such a small quantity, comparatively, that it will intermingle in the final product without any adverse effects.

Fig. 2 illustrates apparatus adapted to manufacture rubberized asphalt in accordance with my invention including means for reheating the rubberized asphalt to reduce viscosity and facilitate the release of steam. Here, the tank 23a may also, in special cases where a very exact proportion of rubber is required and must not be exceeded, serve as a storage tank for a batch of bitumen, and in such case the supply line 15a is interconnected with the tank 23a to conduct bitumen from tank 23a to blending chamber 17, a suitable pump 30 being connected in the line 15a to flow bitumen to the blending chamber 17 under moderate pressure. Otherwise, the arrangement of the apparatus, including the regulating valve 16, the blending chamber 17, the discharge line 18, the latex supply line 20, the froth settling tank 23a and the froth spray line 27 are the same as hereinbefore described.

With this recirculating arrangement, intended for use only in special cases, the latex may be gradually added to the bitumen until tests show a desired quality of rubberized asphalt, or if a definite percentage of latex is to be mixed with the bitumen charge in the tank 23a it may be desirable to put the latex charge in a container 31 of selected volume. This container 31 is connected to the head of the line 20 and the latex therein is forced into the line by pressurized means as by an air, gas or pump pressure line 32 to the container.

In the units hereinbefore and hereinafter described, it is contemplated that suitable means will be provided for keeping the bitumen sufficiently hot to render it flowable at all times. Natural heat loss through the lines will cool the bitumen somewhat and the flashing of the latex water into steam will result in substantial temperature drop. This temperature drop will depend upon the type of bitumen used and the amount of latex to be interblended and may even exceed 150° F. Therefore, whenever necessary, it is most expedient to provide reheating means at the blender 17 immediately beyond the nozzle head 22 and at or above the point of flashing. Such means may consist of a jacket 33 about the blender 17 wherethrough reheating fluid may circulate as from supply and discharge leads 34.

Fig. 3 illustrates apparatus for the manufacture of rubberized asphalt according to a process substantially the same as that described for the Fig. 1 construction, but providing a modified discharge line 18b and eliminating the froth breaking tank 23 and froth spray line 27. The discharge line 18b includes a section 35, flaring into an enlarged continuation 36 of the line which is horizontally disposed or slightly sloped to permit a flow of bitumen therethrough. A series of baffles 37 is spaced within this continuation 36, along the top of the conduit and extending downwardly at an inclination in the direction of flow, to break up bubbles of froth in its movement therethrough. A standpipe 38 is provided at the exit end of this continuation 36, at the top side thereof, to permit a blow-off of released steam and a nipple 39 depends from the underside of the continuation to guide the flow of bitumen into a container 40.

Fig. 4 illustrates apparatus for the manufacture of a cut-back rubberized asphalt, which permits the rubberizing and cut-back operations to be accomplished by a single pass of the bitumen through the apparatus. The bitumen supply line 15, the latex supply line 20, the blender 17 and the froth spray line 27 are substantially the same as hereinbefore described. The discharge line 18c, however, is modified into a second blending chamber 41, similar to chamber 17 but here shown in horizontal position for convenience in drawing, and including mixing baffles 42 similar to baffles 19. The continuation 18c of the discharge line includes a pressure regulating valve 43 for purposes hereinafter described.

A cut-back supply line 44, extends into the discharge line 18c and into the entrance of the chamber 41 and includes a regulating valve 45 and a blending head 46 at its discharge end. It follows that the flow of cut-back fluid into the bitumen may be regulated and the fluid intermixed with the rubberized bitumen, in somewhat the same manner as the injection of the latex, except that there is here no generation of steam.

The manner of operation of this unit will depend upon the temperatures of vaporization of the cut-back fluid. The mixing in the chamber 41 may be under pressure by regulation and partial closing of valve 43, and depending on the nature of the cut-back fluid and upon operating conditions it may be desirable to either cool or reheat the bitumen before it leaves chamber 41 and for this purpose a suitable jacket 47 is provided about the exit end of the chamber, which jacket may be operated for either cooling or heating. The bottom 48 of the tank 23c may be sloped in any desirable manner and provided with a drain 49, at the invert. This tank also, preferably includes a cover 50 to restrain the vapors of the cut-back and a suitable steam release vent 51 may be provided.

Fig. 5 illustrates a preferred construction of the atomizing type of nozzle head 22 and a portion of the latex supply line 20 within the chamber 17. The latex supply line 20, within the chamber, includes an insulating sheath 52 to prevent overheating of the latex by the surrounding hot bitumen.

The head itself is formed as a frusto-conical unit 53 with its base threaded upon the end of the supply line pipe 20, as at 54, and provided with an annular seat 55 surrounding an axial passageway 56. An axially symmetrical plunger 57 extends through this passageway 56 having a head 58 with a conically flared base 59 adapted to rest upon seat 55. The plunger within the head is formed as an axially disposed shaft with a boss 60 at the innermost end. A compression spring 61 abuts against this boss and against a seat 62 surrounding the passageway 56.

The spring 61 normally holds the head 58 against the seat 55 closing the valve, and the valve cannot open except when the pressure in the line 20 is substantially greater than the pressure in the blender 17. As the valve opens, as by movement of the head 58 from the seat 55, the diverging passageway between the seat and base 59 permits the passage of a thin upwardly and outwardly diverging annular sheet of latex which may have a thickness of about one-eighth inch and which moves at relatively high velocity into the moving body of the hot bitumen. Fluid friction and turbulence set up between the surfaces of the jet and the bitumen causes a breaking up of the latex into fine droplets which vaporize with a flashing action as hereinbefore described.

The resulting flashing of the steam and the turbulent flow is suggested at Fig. 6, which illustrates the movement of the injected latex into the bitumen and the action of the baffles providing a substantially perfectly uniform dispersion of the elastomer through the bitumen. It follows that careful control of the rate of flow of the bitumen and the rate of flow of the latex will result in the continuous manufacture of a uniform rubberized asphalt.

Instead of introducing the latex into the hot liquid bitumen through an atomizing type nozzle, as heretofore described, it may be introduced in any other manner. Fig. 7 shows one alternative way of introducing the latex. In this figure, the apparatus is identical with that described in the preceding figures except that the latex is introduced through an open-ended line 20', having a regulating valve 21'. Other parts of the apparatus shown in this figure are designated with the same reference characters as the corresponding parts of Fig. 1, but primed.

In the operation of this form of the apparatus, the latex flows unobstructed from the open end 20a of the pipe 20' into the body of hot, liquid bitumen in the chamber 17'. As the latex is introduced into the hot bitumen, the water content thereof evaporates or flashes into steam, which together with the agitation and stirring caused by flow turbulence and caused by the baffles 19', causes a thorough dispersion or atomization of the latex into the bitumen. In all other respects the operation of this form of the apparatus is the same as the operation of the apparatus of Fig. 1.

Fig. 8 shows another alternative way of introducing the latex. In this figure the apparatus is identical with that described in the preceding figures except that the latex is introduced through an open ended line 20" which terminates at 20b at the wall of the blender 17". Other parts of the apparatus shown in this figure are designated with the same reference characters as the corresponding parts of Fig. 1, but double primed.

In the operation of this form of the apparatus, the latex flows unobstructed from the open end 20b of the pipe 20" and to the body of hot liquid bitumen in the chamber 17". As the latex is introduced into the hot bitumen the water content thereof evaporates or flashes into steam which together with agitation and stirring caused by turbulent flow within the pipe and by the baffle 19" causes a thorough dispersion or atomization of latex into the bitumen. In all other respects the operation of this form of the apparatus is the same as the operation of the apparatus of Figs. 1 and 7.

While I have illustrated and herein described many details and steps of operation, and many details of construction, and alternates and equivalents, it is obvious that those skilled in the art can devise alternate and equivalent steps and constructions which are within the spirit and scope of my invention, and hence it is my desire that my protection be limited, not only by the operations and details herein illustrated and described, but only by the proper scope of the appended claims.

This application is a continuation-in-part of my copending application, Serial No. 457,680, filed September 22, 1954, now abandoned.

I claim:

1. The process of manufacturing rubberized bitumen by interblending an aqueous rubber latex and molten bitumen comprising introducing the latex into a confined body of the molten bitumen moving under pressure through an enclosed zone, the latex being introduced into the molten bitumen at a point within the molten body where the temperature of the bitumen is sufficiently high to evaporate the water of the latex and moving the resultant mixture as a confined body beyond the point of latex introduction for a time period sufficient to obtain vaporization of the water out of the latex to form steam and to obtain dispersion of the rubber throughout the bitumen and discharging the mixture from the enclosed zone for release of the steam.

2. The process of claim 1 in which the bitumen is asphalt.

3. The process of claim 1 in which the latex is introduced into the moving body of bitumen as an upwardly and outwardly diverging annular sheet.

4. The process of claim 1 in which the resultant mixture is subjected to agitation during its continuing movement through the enclosed zone.

5. The process of claim 1 in which the latex is introduced into the hot bitumen adjacent the inlet end of the enclosed zone, and the resultant mixture is heated during its continued movement through said enclosed zone.

6. The process of claim 1 in which the latex is introduced into the bitumen as the latter is moving upwardly through said zone and at a point adjacent the lower end of said zone.

7. The process of manufacturing rubberized bitumen by atomizing an aqueous rubber latex into a molten bitumen comprising the following steps, moving a body of the molten bitumen under pressure through an enclosed zone, introducing the latex into the molten bitumen at a point within the molten body where the temperature of the bitumen is sufficiently high to evaporate the water of the latex and moving the resultant mixture beyond the point of introduction of the latex for a time period sufficient to obtain complete and uniform dispersion of the rubber throughout the bitumen and evaporation of the water out of the latex in the form of steam, thereby atomizing the rubber of the latex into the bitumen.

8. The process of manufacturing rubberized bitumen by interblending an aqueous rubber latex and molten bitumen comprising the following steps, forcing a confined body of the molten bitumen to flow longitudinally through an elongated enclosed zone, introducing the latex into the flowing bitumen at a point within the molten body and at which the temperature of the bitumen is sufficiently high to convert the water content of the latex into steam, thereby converting the water of the latex to steam and atomizing the rubber into the bitumen, continuing the flow of the resultant mixture as a confined body for a time period sufficient to obtain vaporization of the water out of the latex and to obtain substantially uniform dispersion of the rubber in the bitumen and then discharging the mixture from the enclosed zone for release of the steam.

9. A continuous process for the manufacture of rubberized asphalt which comprises continuously forcing a stream of molten asphalt to flow longitudinally through an enclosed, elongated zone, continuously introducing an aqueous rubber latex into the flowing stream of hot asphalt at a point within the body of the stream where the temperature of the asphalt is sufficiently high to convert the water content of the latex into steam, thereby continuously atomizing the latex into the flowing stream of asphalt and converting the water of the latex to steam, continuing the flow of the resultant mixure as a confined body for a time period sufficient to obtain substantially uniform dispersion of the rubber in the asphalt and continuously discharging the mixture from the conduit for release of the steam.

10. The process of claim 9 in which the direction of flow of the stream of molten asphalt is upwardly.

11. The process of claim 10 in which the latex is introduced upwardly into the upwardly flowing stream of molten asphalt.

12. The process for manufacturing rubberized bitumen by interblending an aqueous rubber latex and molten bitumen which comprises maintaining a flowing body of bitumen through an enclosed zone, introducing latex to the molten bitumen flowing through said zone, the temperature and heat content of the flowing body of bitumen at the point of introduction of the latex thereto and from said point to the discharge end of said zone being sufficiently high to evaporate the water of the latex and thereby convert it into steam and to atomize the latex into the flowing body of bitumen and to maintain said water in the form of steam until the resulting mixture reaches the discharge end of said zone, the latex being introduced to said flowing body of molten bitumen sufficiently upstream from the discharge end of said enclosed zone that the latex water is evaporated and the latex rubber is substantially uniformly dispersed in the flowing body of bitumen before the mixture reaches the discharge end of said zone, the steam being released from said mixture as the mixture is discharged from said enclosed zone.

13. The process of manufacturing rubberized bitumen by interblending an aqueous rubber latex and molten bitumen which comprises moving a body of molten bitumen under pressure upwardly through a confined, substantially vertical zone, introducing the latex to the molten bitumen at a point within the enclosed zone below the upper surface of the bitumen where the temperature and heat content of the bitumen are sufficiently high to evaporate the water of the latex, thereby converting the water of the latex to steam and atomizing the latex into the flowing stream of bitumen, and moving the resultant mixture as a confined flowing body beyond the point of latex introduction for a time period and at a temperature sufficient to obtain substantially uniform dispersion of the rubber in the bitumen while maintaining said latex water in the form of steam and discharging the mixture from the enclosed zone and releasing the steam therefrom.

References Cited in the file of this patent

UNITED STATES PATENTS

| | | |
|---|---|---|
| 2,537,190 | Lankau et al. | Jan. 9, 1951 |
| 2,686,166 | Taylor | Aug. 10, 1954 |